(12) United States Patent
Nishimiya

(10) Patent No.: US 12,350,817 B2
(45) Date of Patent: Jul. 8, 2025

(54) METHOD FOR MANUFACTURING GRIPPING TOOL

(71) Applicant: KITAGAWA IRONWORKS CO., LTD., Fuchu (JP)

(72) Inventor: Tamio Nishimiya, Fuchu (JP)

(73) Assignee: KITAGAWA IRONWORKS CO., LTD., Fuchu (JP)

( * ) Notice: Subject to any disclaimer, the term of this patent is extended or adjusted under 35 U.S.C. 154(b) by 0 days.

(21) Appl. No.: 18/719,121

(22) PCT Filed: Dec. 9, 2022

(86) PCT No.: PCT/JP2022/045541
§ 371 (c)(1),
(2) Date: Jun. 12, 2024

(87) PCT Pub. No.: WO2023/112865
PCT Pub. Date: Jun. 22, 2023

(65) Prior Publication Data
US 2025/0050510 A1    Feb. 13, 2025

(30) Foreign Application Priority Data
Dec. 13, 2021    (JP) .................................. 2021-201880

(51) Int. Cl.
*B25J 15/00* (2006.01)
*B23B 31/16* (2006.01)
(Continued)

(52) U.S. Cl.
CPC ......... *B25J 15/00* (2013.01); *B23B 31/16054* (2013.01); *B23B 31/16241* (2013.01);
(Continued)

(58) Field of Classification Search
CPC ........ B23B 31/16279; B23B 2260/132; B23B 2231/342; Y10T 279/17666; Y10T 279/3462
See application file for complete search history.

(56) References Cited

U.S. PATENT DOCUMENTS 7,441,992 B2 * 10/2008 Hedberg ................. B23B 29/04
407/103
2011/0277602 A1 * 11/2011 Kobayasi .......... B23B 31/16279
279/66

FOREIGN PATENT DOCUMENTS

JP    H05-192807 A    8/1993
JP       3103906 U    8/2004
(Continued)

*Primary Examiner* — Jacob J Cigna
(74) *Attorney, Agent, or Firm* — Maschoff Brennan

(57) ABSTRACT

Provided is a method for manufacturing a gripping tool for gripping a workpiece with top jaws (30) attached to a plurality of master jaws (20) attached to a gripping tool body (10). A first positioner (21, 24) that determines the distance of the top jaw from the center axis of the top jaw when the top jaw is attached to the master jaw is formed in a direction perpendicular to a slide direction in a surface of the master jaw. The method includes a step of attaching the plurality of master jaws to the gripping tool body, a step of gripping a shaping plug (70) by sliding the plurality of master jaws toward the center axis, and a step of finishing, in the surface of the master jaw, the first positioner extending in the direction perpendicular to the slide direction.

6 Claims, 16 Drawing Sheets

(51) Int. Cl.
*B23B 31/177* (2006.01)
*B23C 3/30* (2006.01)
*B24B 19/00* (2006.01)
*B25B 1/24* (2006.01)
*B25B 5/16* (2006.01)

(52) U.S. Cl.
CPC ...... *B23B 31/16275* (2013.01); *B24B 19/009* (2013.01); *B25B 1/2405* (2013.01); *B25B 5/163* (2013.01); *B23B 31/16* (2013.01); *B23B 2260/072* (2013.01); *B23B 2260/132* (2013.01); *B23C 3/30* (2013.01); *B23C 2220/28* (2013.01)

(56) References Cited

FOREIGN PATENT DOCUMENTS

| | | | |
|---|---|---|---|
| JP | 2010-110884 A | | 5/2010 |
| JP | 2014-155992 A | | 8/2014 |
| KR | 20200033905 A | * | 3/2020 |
| WO | 2010/084584 A1 | | 7/2010 |

* cited by examiner

METHOD FOR MANUFACTURING GRIPPING TOOL

TECHNICAL FIELD

The present invention relates to a method for manufacturing a gripping tool for gripping a workpiece with top jaws each attached to a plurality of master jaws by sliding the plurality of master jaws toward a center axis.

BACKGROUND ART

When machining is performed while a workpiece is rotated by, e.g., a lathe, a chuck is used as a device (gripping tool) for gripping the workpiece, for example.

The chuck includes master jaws provided in the front surface of a chuck body and sliding in a radial direction and top jaws each attached to the master jaws and gripping the workpiece.

In contact surfaces of the master jaw and the top jaw, serrations (continuous bumps and dips having a sawtooth-shaped section) are formed in a direction perpendicular to the slide direction of the master jaw. When the top jaw is attached to the master jaw, these serrations engage with and closely contact each other, and in this manner, the top jaw is fixed with positioned relative to the master jaw in the radial direction with high accuracy.

In order to enhance workpiece gripping accuracy when the top jaw is attached to the master jaw, there has been known a method in which a gripping surface of the top jaw is shaped in a state of the top jaw being attached to the master jaw (for example, Patent Document 1).

CITATION LIST

Patent Document

PATENT DOCUMENT 1: Japanese Unexamined Patent Publication No. 2010-110884

SUMMARY OF THE INVENTION

Technical Problem

In a case where the gripping surface of the top jaw is shaped in a state of the top jaw being attached to the master jaw (on-machine shaping), even if the top jaw is temporarily detached and is attached to the master jaw again, the workpiece gripping accuracy is slightly degraded, but is within an acceptable range in many cases.

However, a chuck body, each master jaw, and a component (e.g., plunger) that slides the master jaw in the radial direction are produced individually, and for this reason, there is variation in component dimensions even among the same components. Thus, in a state of these components being assembled, the position of the serrations and the position of a positioner in the direction in which the serrations extend vary according to the master jaw due to a cumulative error in the dimensions of each component.

When the gripping surface of the top jaw is formed by on-machine shaping, a distance between the shaped gripping surface and the center axis of the chuck is aligned among the top jaws, but the top jaws are shaped with different dimensions to correct dimension deviation for different master jaws. For this reason, when the top jaw is attached to a master jaw of another chuck different from one obtained by on-machine shaping, the gripping accuracy is significantly degraded beyond the acceptable range in many cases. Moreover, even in a case where the top jaw is attached to the master jaw of the same chuck as that obtained by on-machine shaping, if the top jaw is attached to the master jaw at a different position, the gripping accuracy is significantly degraded.

Thus, the top jaw having the gripping surface formed by on-machine shaping does not have compatibility. Even when the same workpiece is machined, a top jaw set is required for each chuck, and it is necessary to manage which one of the master jaws each top jaw corresponds.

The present invention has been made in view of the above-described points, and a main object thereof is to provide a method for manufacturing a gripping tool configured so that the compatibility of a top jaw can be ensured.

Solution to the Problem

The method for manufacturing the gripping tool according to the present invention is a method for manufacturing a gripping tool for gripping a workpiece with a plurality of top jaws each attached to a plurality of master jaws attached to a surface of a gripping tool body such that the center of the workpiece coincides with a center axis by sliding the plurality of master jaws toward the center axis. A first positioner that determines the distance of each top jaw from the center axis when each top jaw is attached to a corresponding one of the master jaws is formed in a direction perpendicular to a slide direction in a surface of each master jaw. The method includes a step of attaching the plurality of master jaws to the gripping tool body such that the plurality of master jaws is slidable toward the center axis, a step of gripping a shaping plug with the plurality of master jaws by sliding the plurality of master jaws toward the center axis, and a step of finishing, in the surface of each master jaw, the first positioner extending in the direction perpendicular to the slide direction of the master jaws in a state of the shaping plug being gripped.

Advantages of the Invention

According to the present invention, the method for manufacturing the gripping tool configured so that the compatibility of the top jaw can be ensured can be provided.

DESCRIPTION OF EMBODIMENTS

Hereinafter, embodiments of the present invention will be described in detail based on the drawings. Note that the present invention is not limited to the following embodiments. Moreover, changes can be made as necessary without departing from a scope in which advantages of the present invention are provided.

First Embodiment

Figure 1:
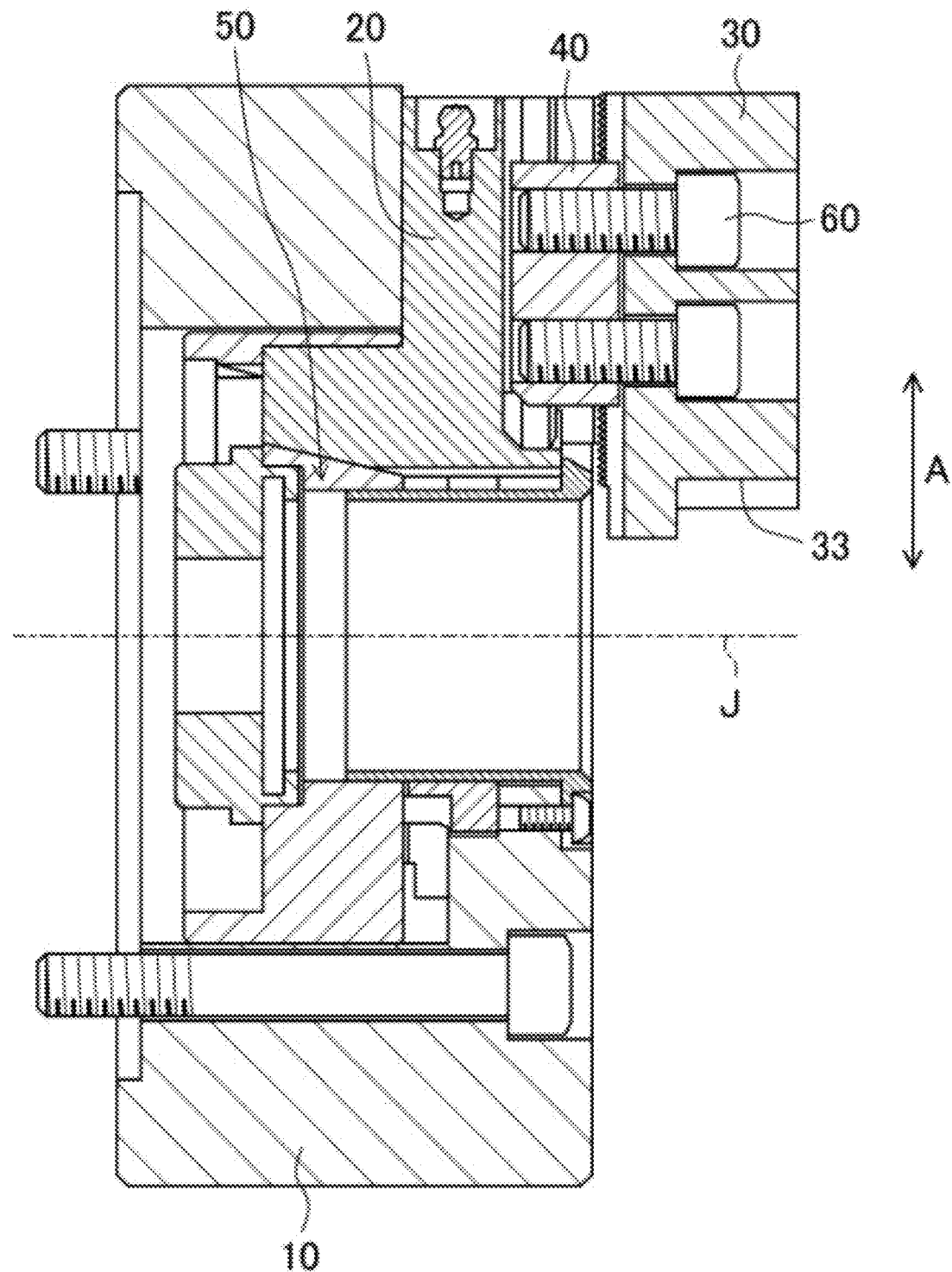
FIG. 1 is a sectional view schematically showing the configuration of a chuck in a first embodiment of the present invention.

FIG. 1 is a sectional view schematically showing the configuration of a chuck (gripping tool) in a first embodiment of the present invention.

In a chuck body (one example of a gripping tool body) 10, a plurality (three in the present embodiment) of master jaws 20 is radially arranged at equal intervals. A top jaw 30 is detachably attached, with a bolt 60, to the master jaw 20 through a T-nut (coupling member) 40 shown in FIG. 3.

A plunger 50 that slides in the direction of a center axis J is built in the chuck body 10. Along with slide of the plunger 50, each master jaw 20 slides toward the center axis J in a slide direction (A-direction in the figure). Accordingly, a workpiece is gripped by gripping surfaces 33 of the top jaws 30 attached to the master jaws 20.

Figure 2:
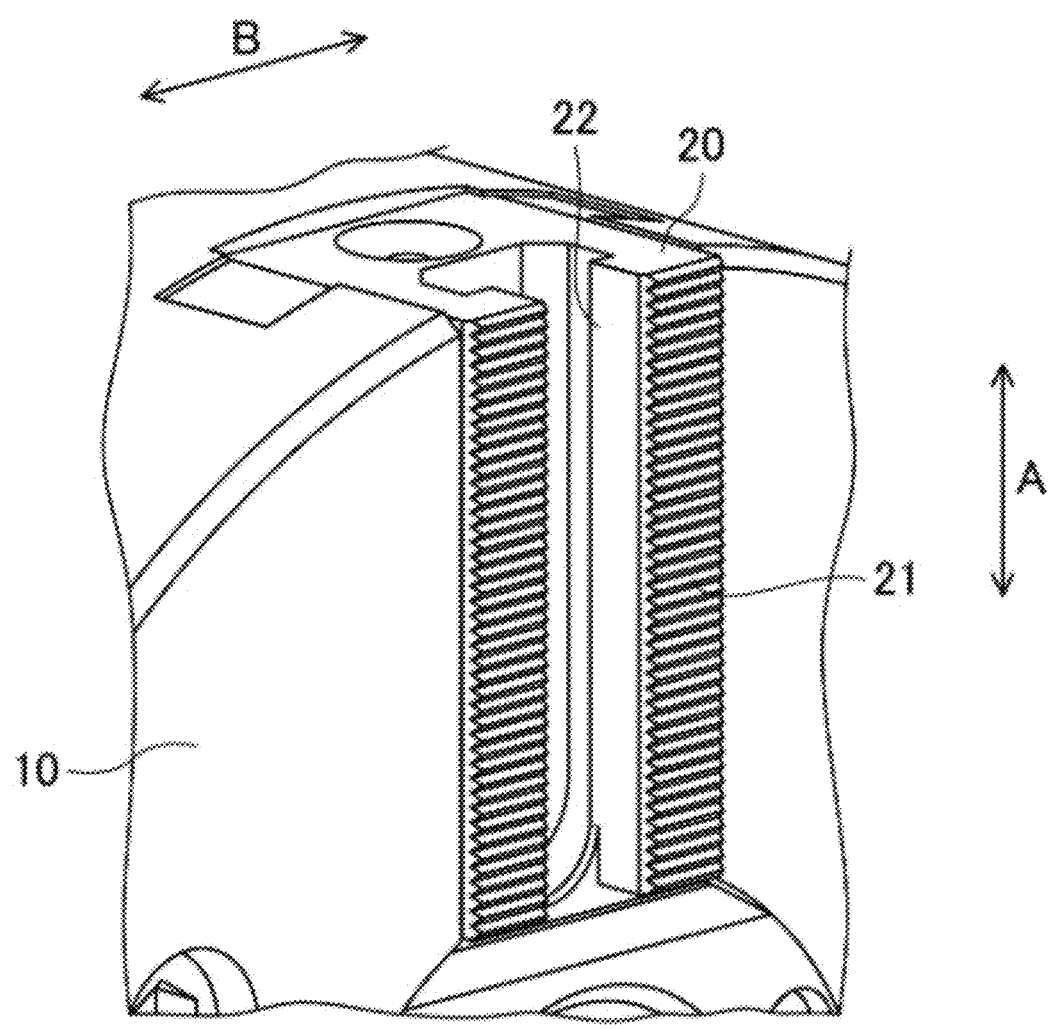
FIG. 2 is a perspective view showing part of the chuck.

As shown in FIG. 2, serrations 21 are formed in surfaces of the master jaw 20 so as to extend in a direction (B-direction in the figure) perpendicular to the slide direction. The serrations 21 include a group of linear raised portion and linear recessed portions which are continuous bumps and dips having a substantially triangular sectional shape. Moreover, the master jaw 20 is formed with a groove 22 which has a substantially T sectional shape and extending in the slide direction (A-direction in the figure).

In the present embodiment, the serrations 21 formed in the surface of the master jaw 20 are equivalent to a "first positioner" that determines the distance of the top jaw 30 from the center axis J when the top jaw 30 is attached to the master jaw 20. Moreover, the groove 22 formed in the master jaw 20 is equivalent to a "second positioner" that determines the position of the top jaw 30 in the direction perpendicular to the slide direction when the top jaw 30 is attached to the master jaw 20.

Figure 3:
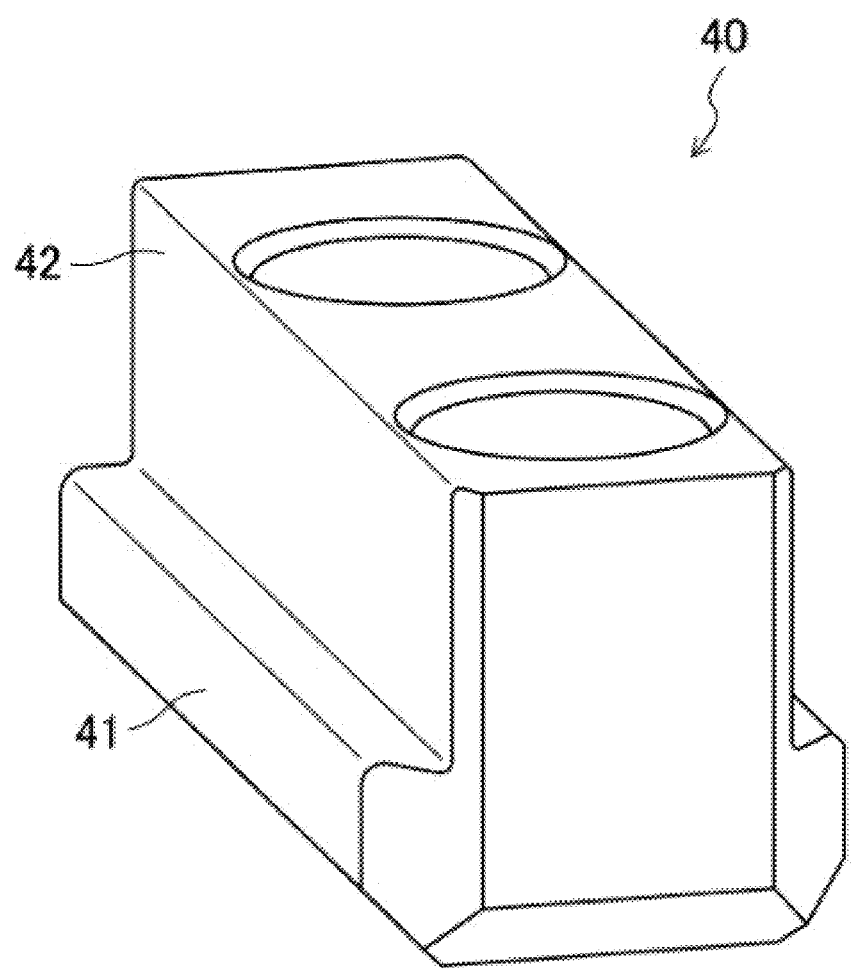
FIG. 3 is a perspective view showing the configuration of a T-nut.

As shown in FIG. 3, the T-nut 40 includes a rectangular columnar member having a substantially T cross-sectional shape, and has a wide portion 41 and a narrow portion 42. The T-nut 40 is inserted along the groove 22 of the master jaw 20.

Figure 4:
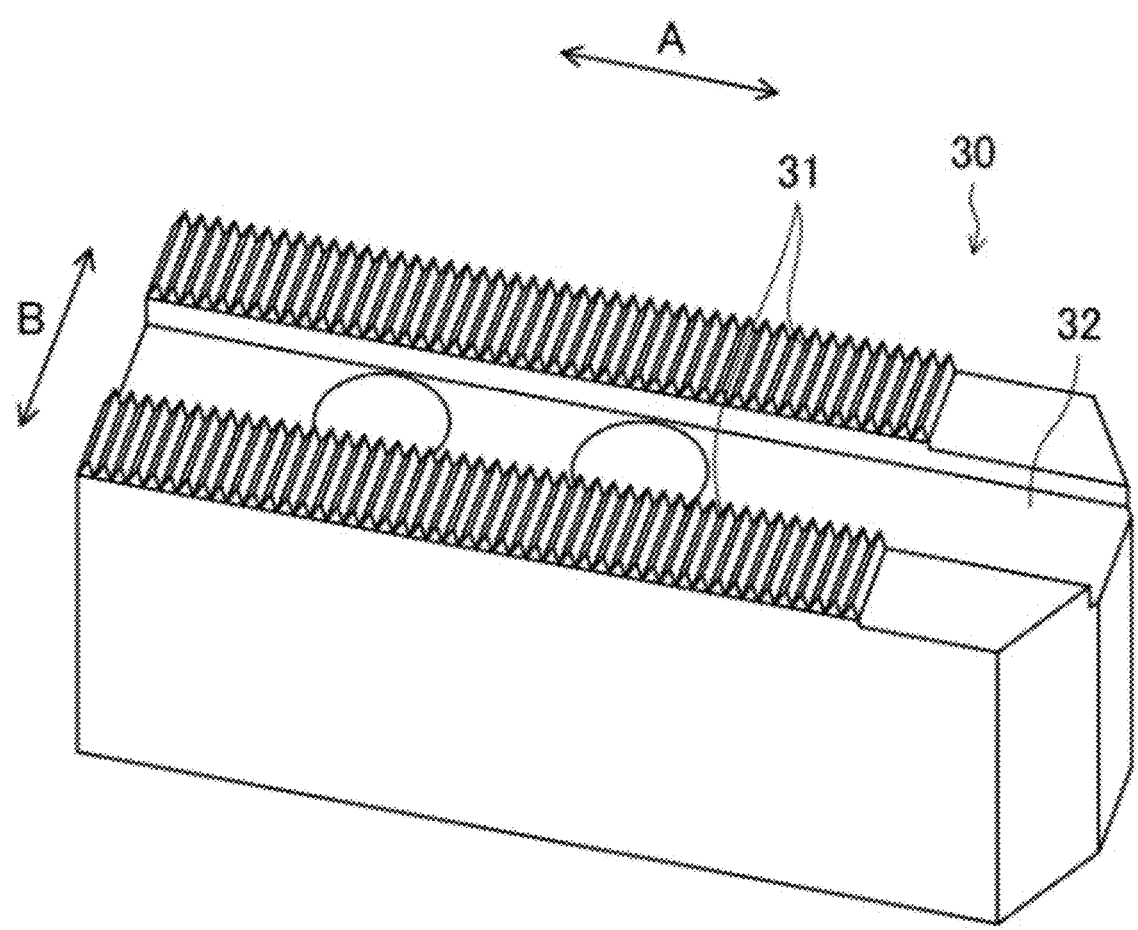
FIG. 4 is a perspective view showing the configuration of a top jaw.
Figure 5:
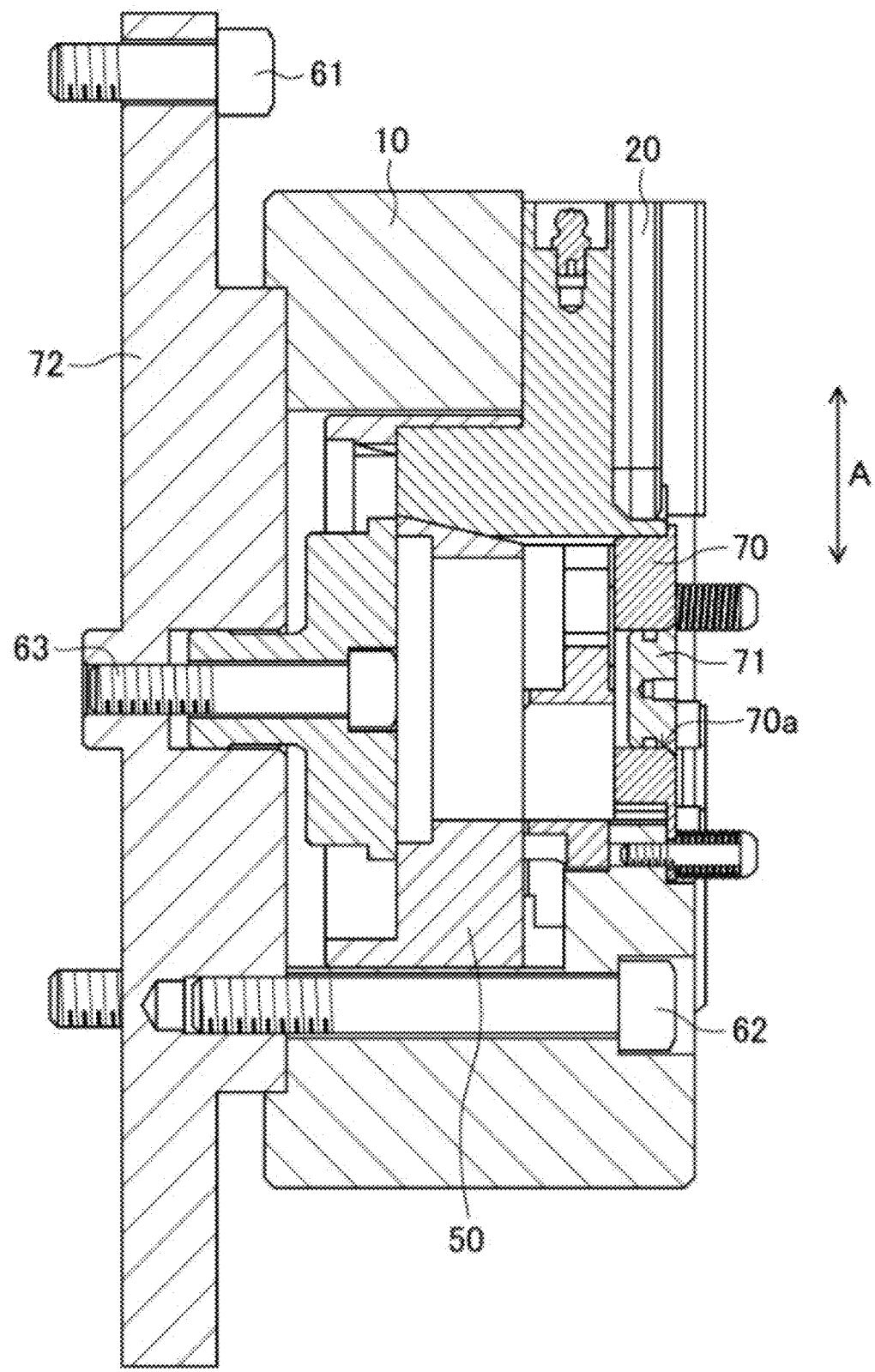
FIG. 5 is a sectional view for describing a method for manufacturing the chuck.

As shown in FIG. 4, serrations 31 are formed in surfaces of the top jaw 30 contacting the master jaw 20 so as to extend in the direction (B-direction in the figure) perpendicular to the slide direction (A-direction in the figure). The serrations 31 are formed corresponding to the serrations 21 formed in the master jaw 20, and the serrations 31 and the serrations 21 engage with and closely contact each other to position the top jaw 30 in the slide direction and the direction of the center axis J. In this manner, the distance of the gripping surface 33 from the center axis J is determined.

Moreover, the top jaw 30 is formed with a key groove 32 extending in the slide direction. The narrow portion 42 of the T-nut 40 is fitted in the key groove 32, and in this manner, the top jaw 30 is positioned in the direction perpendicular to the slide direction. In this manner, the position of the gripping surface 33 in the direction perpendicular to the slide direction is determined.

Next, a method for manufacturing the chuck (gripping tool) in the present embodiment will be described with reference to FIGS. 5 to 9. The method for manufacturing the chuck (gripping tool) in the present embodiment is characterized in that the above-described first positioner (serrations 21) and the above-described second positioner (groove 22) are finished in the master jaw 20.

First, the plurality of master jaws 20 is attached to the chuck body 10 so as to slide toward the center axis J. Specifically, the plunger 50 coupled to the master jaws 20 and sliding in the direction of the center axis J is built in the chuck body 10, and along with slide of the plunger 50, each master jaw 20 can slide toward the center axis J.

Next, the chuck body 10 to which the plurality of master jaws 20 is attached is attached to a shaping jig 72 with a bolt 62.

Next, a shaping plug gripping bolt 63 attached to the plunger 50 is rotated with a wrench, and in this manner, the plunger 50 is moved in the direction of the center axis J. Accordingly, the plurality of master jaws 20 slides toward the center axis J, and a shaping plug 70 is gripped with the plurality of master jaws 20. At this time, operation with the wrench is performed through a wrench insertion hole 70a provided at the center of the shaping plug 70. Thereafter, a dustproof cover 71 is attached to the wrench insertion hole 70a.

Figure 6:
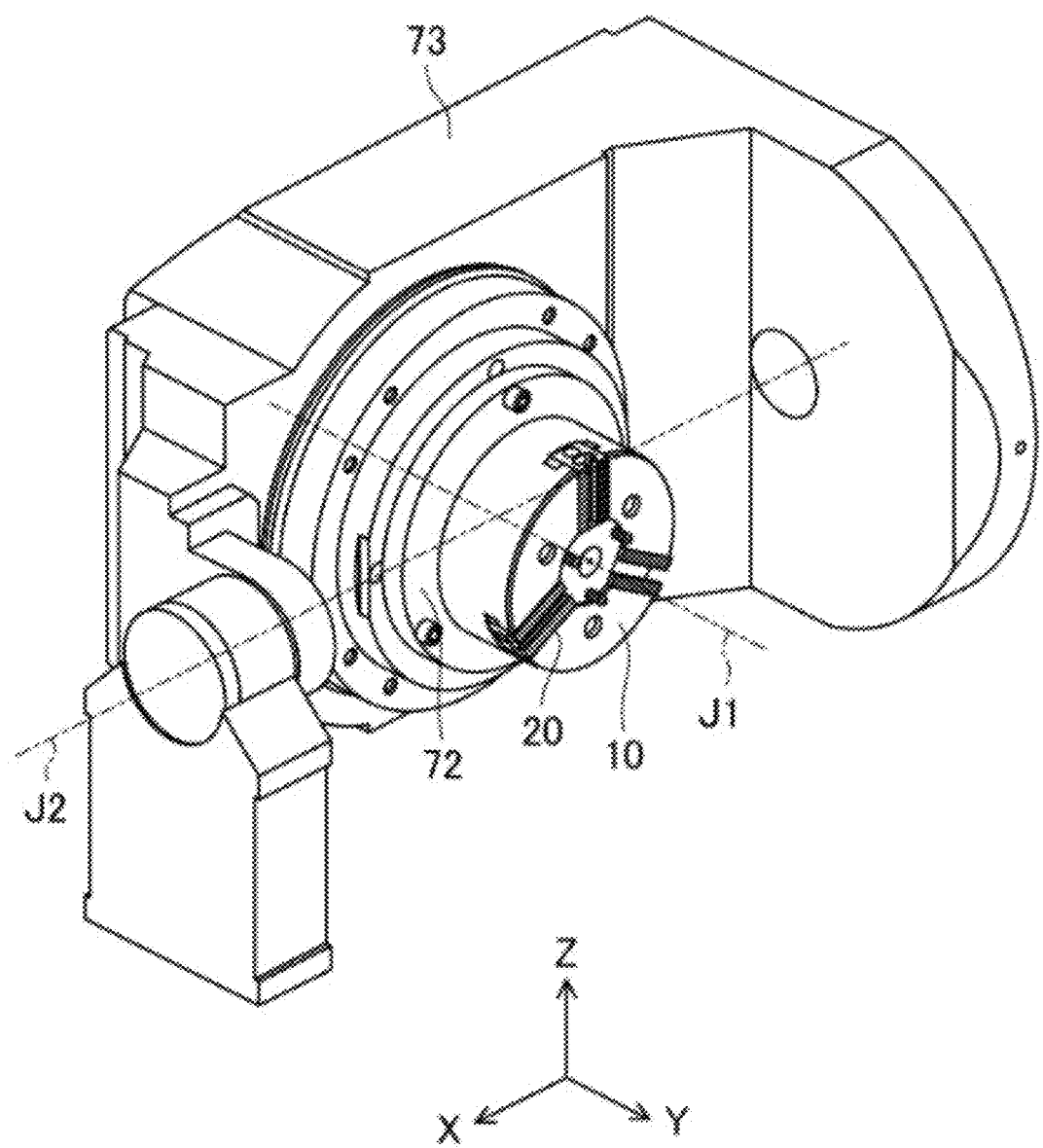
FIG. 6 is a perspective view for describing the method for manufacturing the chuck.

Next, as shown in FIG. 6, the shaping jig 72 to which the chuck body 10 is attached is attached to a five-axis machining center (rotating axis, tilting axis, X-axis, Y-axis, Z-axis) 73 with a bolt 61. At this time, the center axis J of the chuck body 10 and the rotating axis J1 of the five-axis machining center 73 are precisely aligned with each other (coincide with each other). Instead of the five-axis machining center, for example, a combination of a three-axis machining center (X-axis, Y-axis, Z-axis) and a two-axis NC rotary table (rotating axis, tilting axis) may be used. In the present embodiment, the rotating axis of a shaping tool is parallel with the Z-axis.

Next, for finishing the master jaw 20, the five-axis machining center 73 is operated such that the center axis J of the chuck body 10 is parallel with the Y-axis, and a tilting axis J2 is determined. In this manner, the center axis J of the chuck body 10 and the rotating axis of the shaping tool are perpendicular to each other.

Next, the rotating axis J1 is determined such that the slide direction of the master jaw 20 is parallel with the Z-axis. Here, the rotating axis J1 and the tilting axis J2 may be simultaneously determined, or the rotating axis J1 may be determined first.

Figure 7:
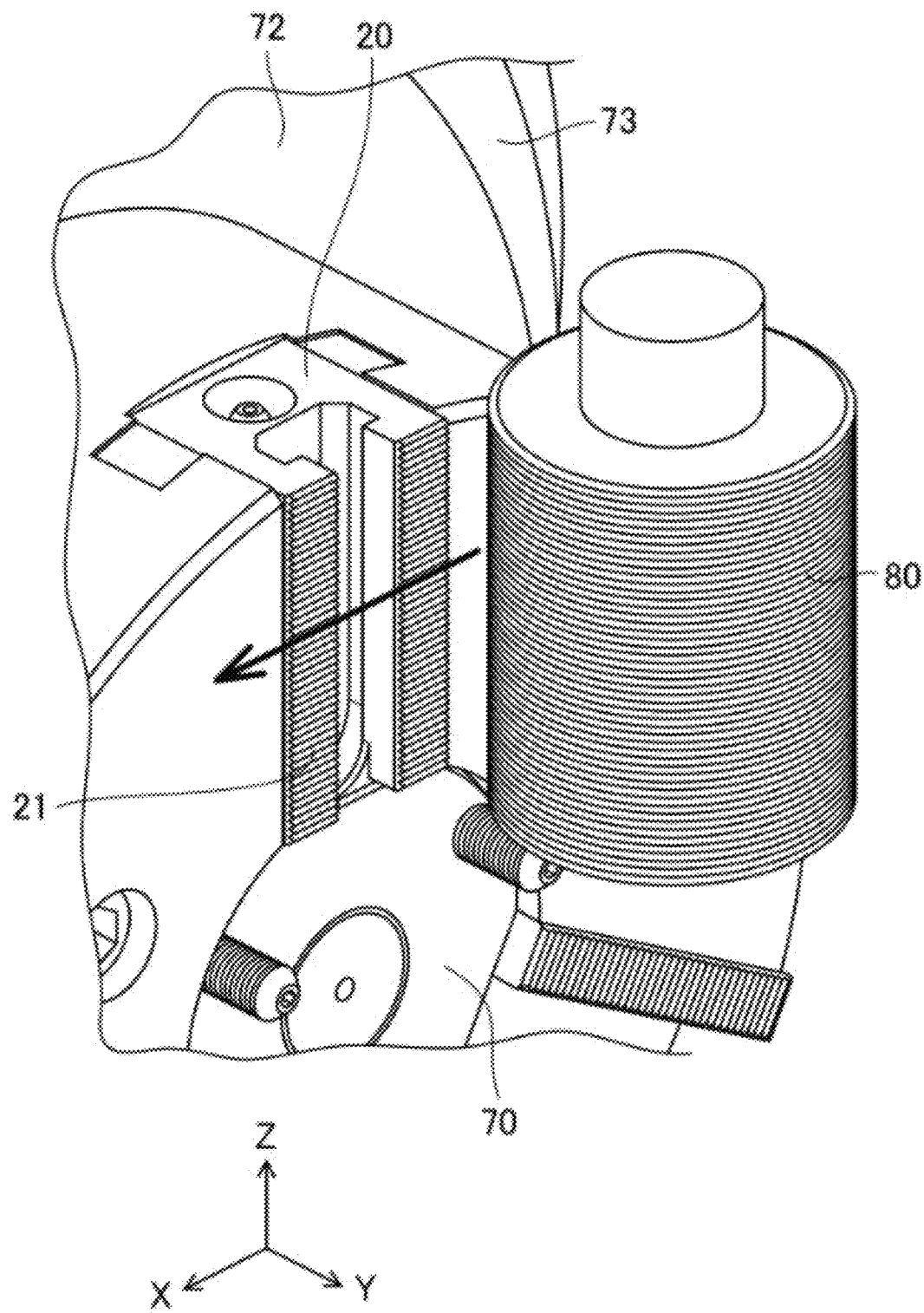
FIG. 7 is a perspective view for describing a step of machining serrations.

As shown in FIG. 7, in a state of the shaping plug 70 being gripped, the serrations 21 are finished (on-machine shaping) in the surfaces of the master jaw 20 in such a manner that a shaping tool 80 is operated in a direction (direction perpendicular to the slide direction of the master jaw 20) parallel with the X-axis direction while rotating.

In the case of three master jaws 20, the serrations 21 may be finished in each master jaw 20 while the rotating axis J1 of the five-axis machining center 73 is determined by 120°.

Figure 8:
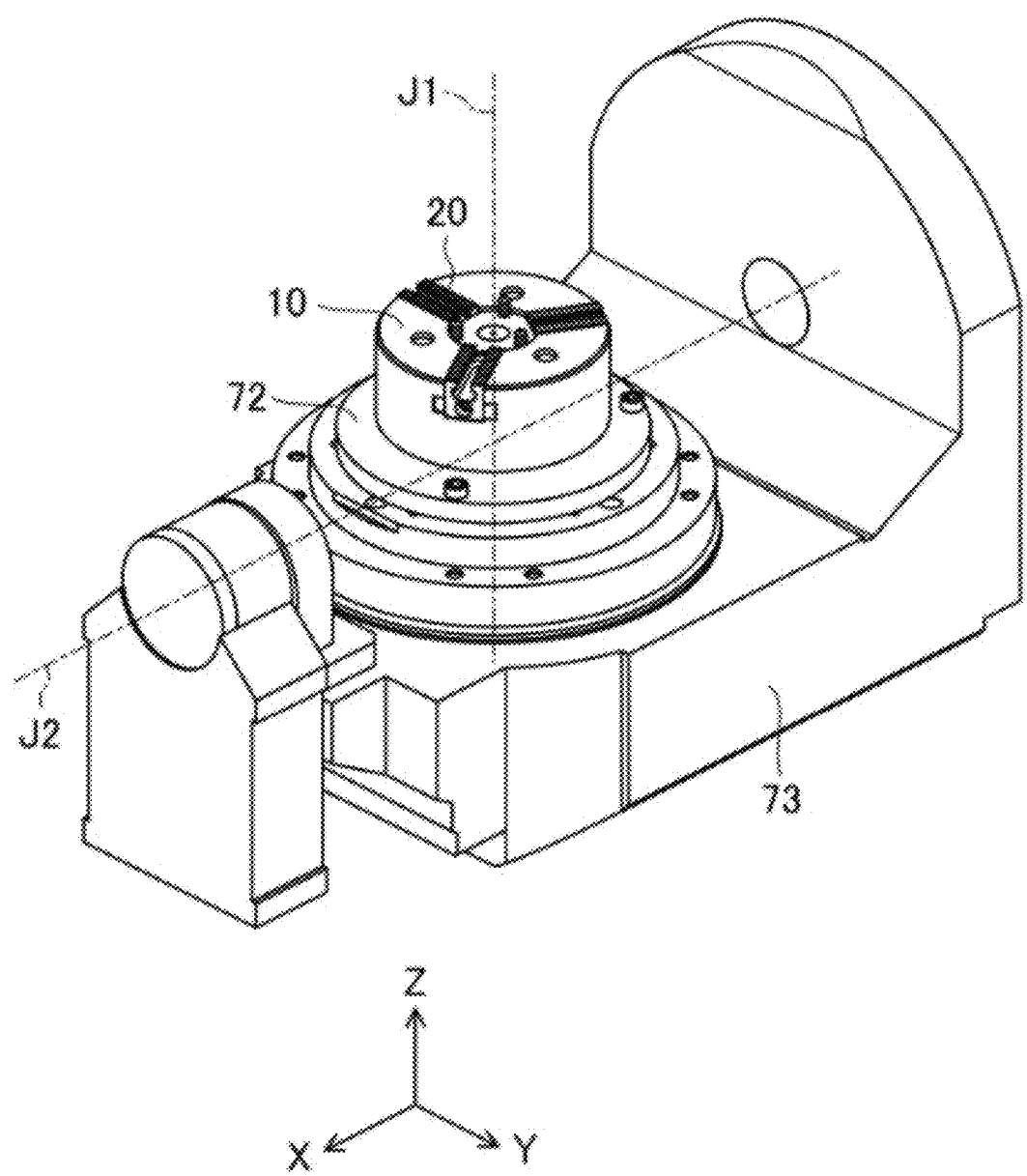
FIG. 8 is a perspective view for describing the method for manufacturing the chuck.
Figure 9:
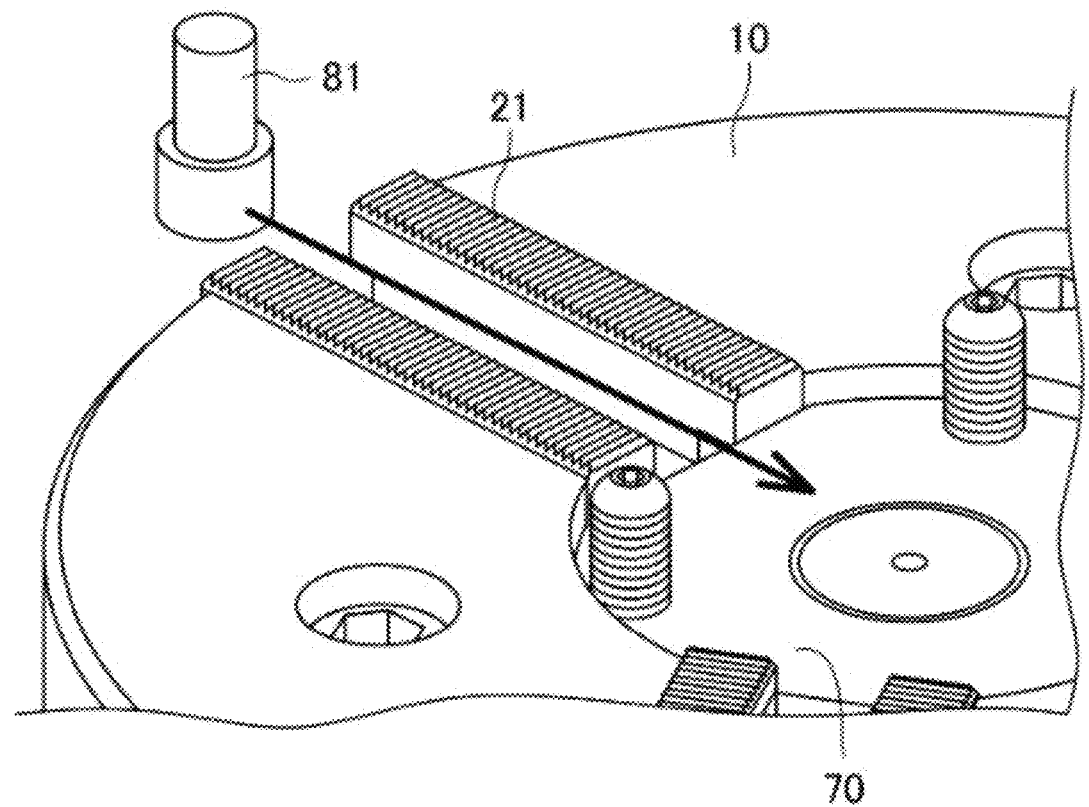
FIG. 9 is a perspective view for describing a step of machining a key groove.

Next, as shown in FIG. 8, the tilting axis J2 is determined such that the center axis J of the chuck body 10 is parallel with the Z-axis. Then, as shown in FIG. 9, in a state of the shaping plug 70 being gripped, the groove 22 is finished (on-machine shaping) in the master jaw 20 in such a manner that a shaping tool 81 is operated in the slide direction while rotating. At this time, the groove 22 is finished such that the center thereof faces the center axis J.

In the case of three master jaws 20, the groove 22 may be finished in each master jaw 20 while the rotating axis J1 of the five-axis machining center 73 is determined by 120°.

Note that in a machine tool such as a five-axis machining center, slight misalignment of a machining position due to lost motion (positioning error due to a difference in an operation direction) is caused. In order to minimize such a machining dimension error, the grooves 22 of all the master jaws are preferably finished from the same direction. Thus, the rotating axis J1 is determined so that finishing from the same direction can be performed.

As another method, in a case where required finishing accuracy is obtained without the need for determining the rotating axis J1, each groove 22 may be finished by control of the X-axis and the Y-axis.

According to the present embodiment, in a state of the shaping plug 70 being gripped, the serrations (first positioner) 21 extending in the direction perpendicular to the slide direction of the master jaw are finished in the surfaces of each of the plurality of master jaws 20, and therefore, the position of the serrations 21 relative to the center axis J, i.e., the distance (radial position) from the center axis J and the position in the direction of the center axis J, can be aligned among all the master jaws 20.

Moreover, in a state of the shaping plug 70 being gripped, the groove (second positioner) 22 extending in the slide direction is finished in each of the plurality of master jaws 20, and therefore, the position of the groove 22 relative to the center axis J in the direction perpendicular to the slide direction can be aligned among all the master jaws 20.

With these configurations, even when a top jaw 30 of a certain chuck (gripping tool) formed with a gripping surface 33 by on-machine shaping is attached to a master jaw 20 of another chuck, workpiece gripping accuracy can be favorably maintained, and the compatibility of the top jaw 30 can be ensured. In addition, since the top jaw 30 has the compatibility, top jaws 30 obtained by on-machine shaping can be replaced with each other among a plurality of master jaws 20 in one chuck.

In the present embodiment, it is important that the plurality of master jaws 20 grips the shaping plug 70 by sliding toward the center axis J in a state of the plurality of master jaws 20 being attached to the chuck body 10 and the serrations (first positioner) 21 and the groove (second positioner) 22 are finished in each of the plurality of master jaws 20 in this state.

Machining itself of the serrations 21 and the groove 22 is not limited to the five-axis machining center, and by a combination of a well-known indexing device (e.g., rotary table, NC rotary table, or index table) with, e.g., a surface grinder, a machining center, or a milling machine, may be performed while the machining positions of the serrations 21 and the groove 22 are determined. Alternatively, the serrations 21 and the groove 22 may be finished by separate machine tools. Note that the serrations 21 and the groove 22 are in a linear shape and cannot be finished by a lathe, and for this reason, a machine tool capable of performing linear machining needs to be employed as a machine tool for finishing the serrations 21 and the groove 22.

In the present embodiment, the order of machining the serrations 21 and the groove 22 is not particularly limited, and the serrations 21 may be finished after the groove 22 has been finished. Alternatively, the serrations 21 and the groove 22 may be repeatedly finished for each master jaw 20.

Generally, the shaping tool 80 and the shaping tool 81 are abraded due to machining and dressing (the case of a grindstone), and for this reason, in order to align the dimension among the plurality of master jaws 20, finishing is not completed by one determination of the rotating axis, but is preferably separately performed multiple times. Preferably, in this case, the serrations 21 of the plurality of master jaws 20 are sequentially finished little by little, and such machining is repeated.

In a case where the required workpiece gripping accuracy is obtained only by finishing of the serrations 21, the groove 22 is not necessarily finished by on-machine shaping, and a component may be finished individually.

In the present embodiment, the chuck body 10 to which the plurality of master jaws 20 is attached is attached to the shaping jig 72, and thereafter, is attached to the five-axis machining center 73. However, the shaping jig 72 may be attached to the five-axis machining center 73, and thereafter, the chuck body 10 to which the plurality of master jaws 20 is attached may be attached to the shaping jig 72.

Movement of the plunger 50 for gripping the shaping plug 70 with the plurality of master jaws 20 may be performed using a cylinder or an actuator instead of using the shaping plug gripping bolt 63. In this case, the shaping plug 70 can be automatically gripped.

Second Embodiment

A second embodiment is a centering vise while the gripping tool of the first embodiment is the chuck.

Figure 10:
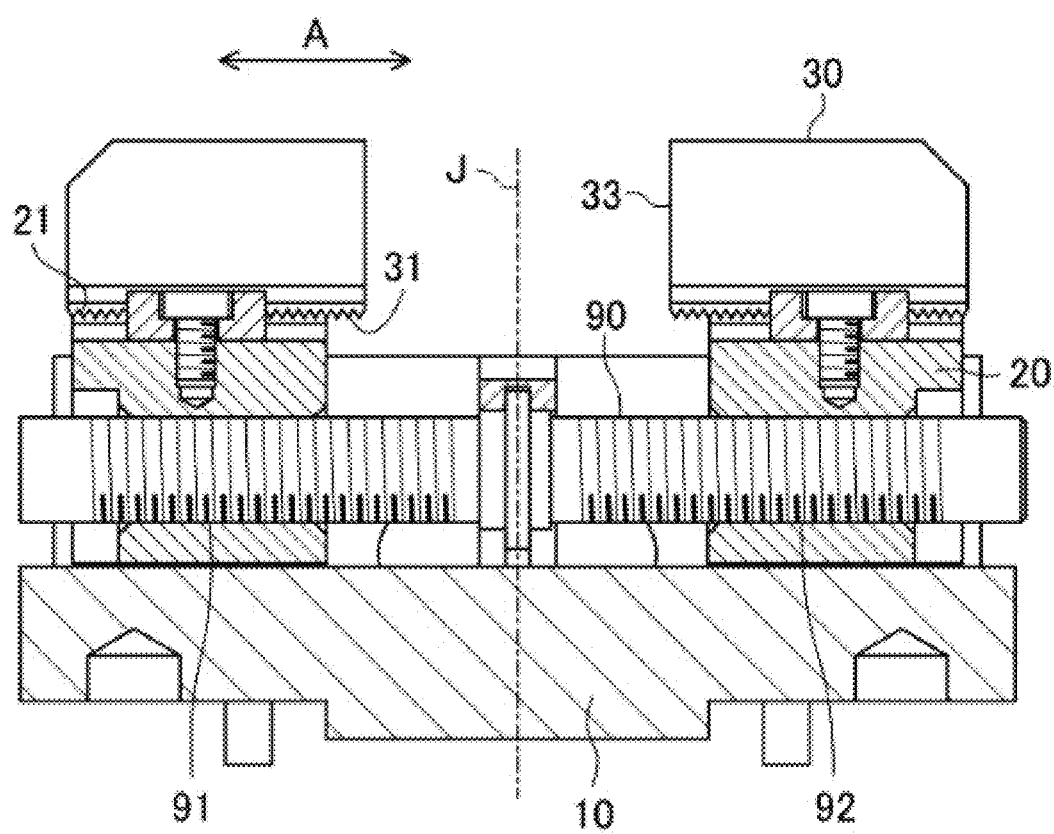
FIG. 10 is a sectional view schematically showing the configuration of a centering vise in a second embodiment of the present invention.
Figure 11:
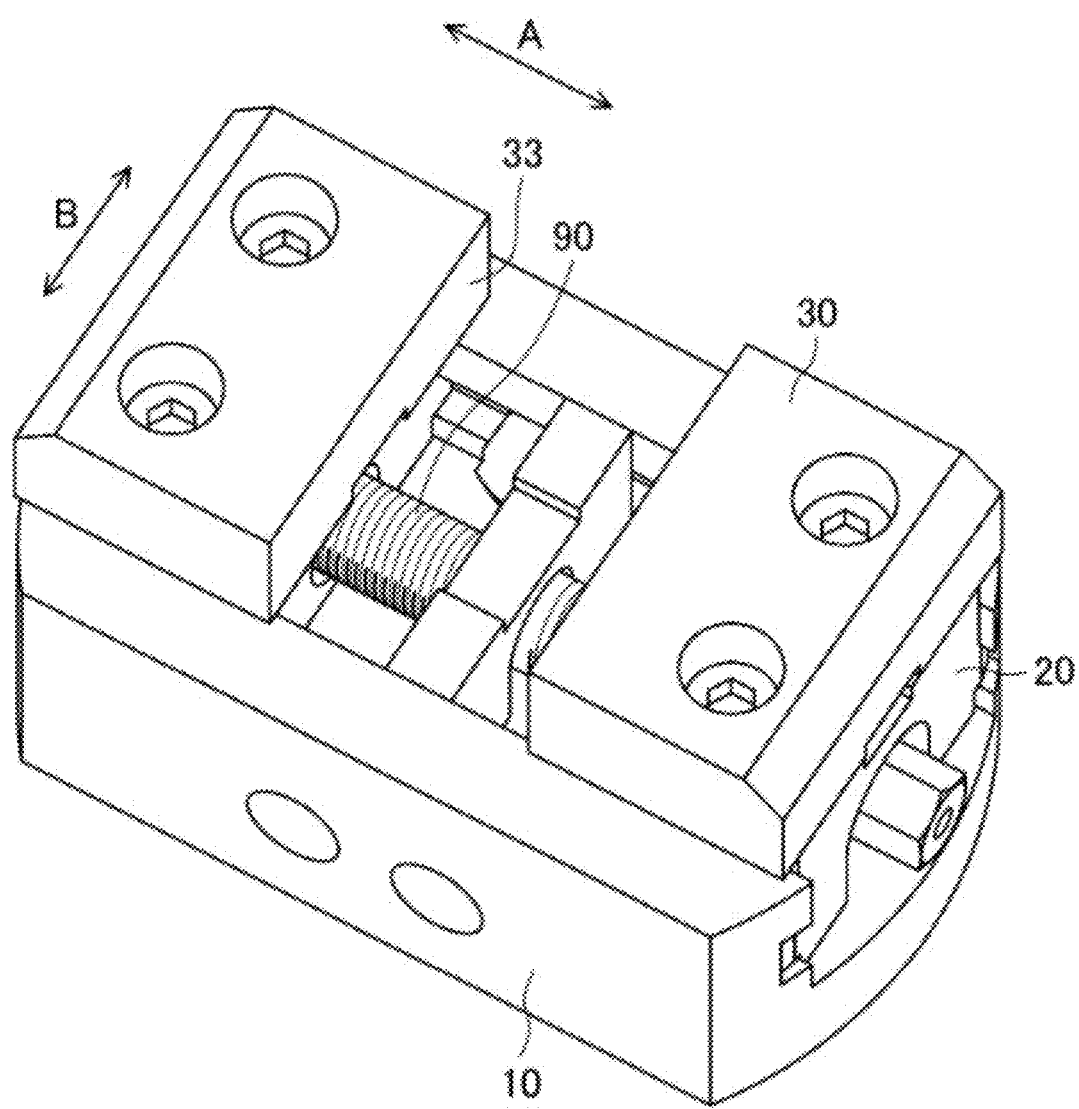
FIG. 11 is a perspective view schematically showing the configuration of the centering vise.

FIG. 10 is a sectional view schematically showing the configuration of the centering vise (gripping tool) in the second embodiment of the present invention, and FIG. 11 is a perspective view of the centering vise.

Figure 12:
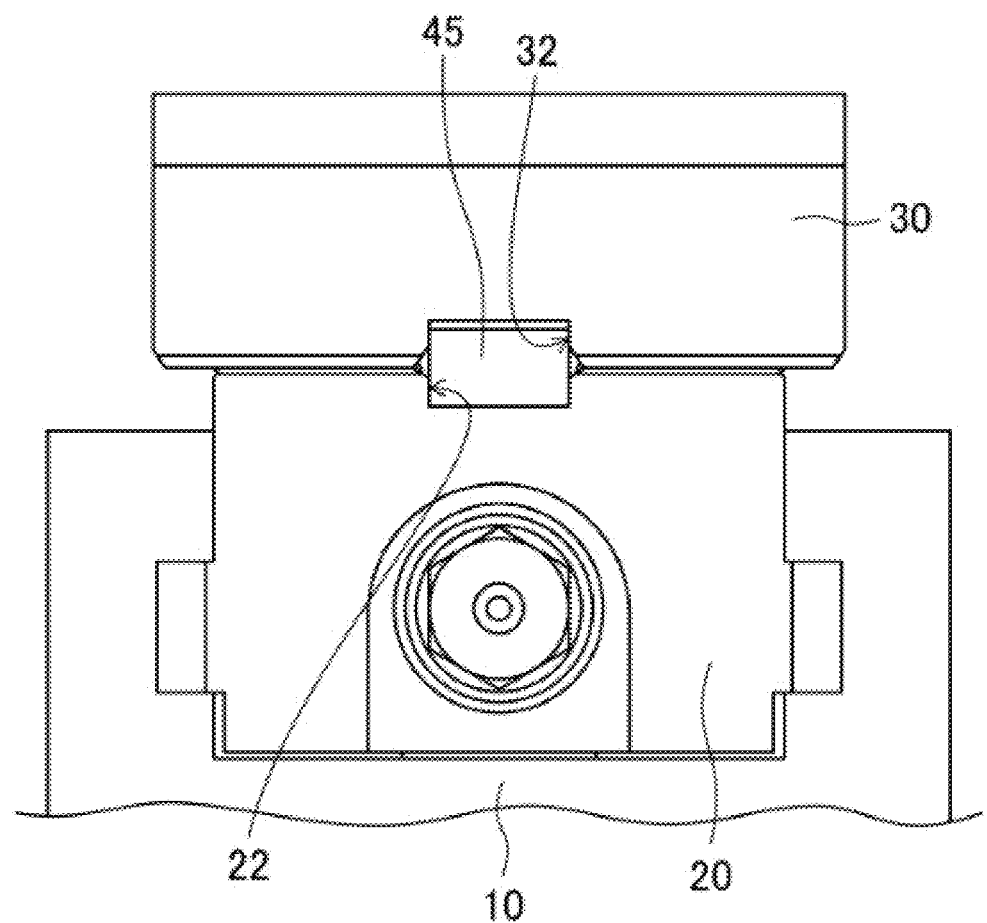
FIG. 12 is a sectional view showing part of the centering vise.

As shown in FIGS. 10 and 11, a pair of master jaws 20 is fitted and arranged in a guide groove of a vise body 10 (one example of the gripping tool body). Top jaws 30 are each detachably attached to the pair of master jaws 20 through coupling members 45, as shown in FIG. 12.

Thread surfaces of a right screw 91 and a left screw 92 are formed inside the pair of master jaws 20. A spindle 90 formed with a thread surface to be screwed to the right screw 91 and the left screw 92 formed in the pair of master jaws 20 is arranged in the guide groove of the vise body 10.

By rotation of the spindle 90, the pair of master jaws 20 slides toward a center axis J. Accordingly, the pair of top jaws 30 attached to the pair of master jaws moves toward the center axis J, and a workpiece can be gripped with gripping surfaces 33 of the top jaws 30.

Serrations 21 are formed in surfaces of the master jaw 20 so as to extend in a direction (B-direction in the figure) perpendicular to a slide direction (A-direction in the figure). Moreover, as shown in FIG. 12, a groove 22 extending in the slide direction is formed in the master jaw 20.

In the present embodiment, the serrations 21 formed in the surfaces of the master jaw 20 is equivalent to a "first positioner" that determines the distance of the top jaw 30 from the center axis J when the top jaw 30 is attached to the master jaw 20. Moreover, the groove 22 formed in the master jaw is equivalent to a "second positioner" that determines the position of the top jaw 30 in the direction perpendicular to the slide direction when the top jaw 30 is attached to the master jaw 20.

Serrations 31 are formed in surfaces of the top jaw 30 contacting the master jaw 20 so as to extend in the direction perpendicular to the slide direction. The serrations 31 are formed corresponding to the serrations 21 formed in the master jaw 20, and the serrations 31 and the serrations 21 engage with and closely contact each other to position the top jaw 30 in the slide direction and the direction of the center axis J. In this manner, the distance of the gripping surface 33 from the center axis J is determined.

Moreover, the top jaw 30 is formed with a key groove 32 extending in the slide direction. The coupling member 45 is fitted in the key groove 32, and in this manner, the top jaw 30 is positioned in the direction perpendicular to the slide direction.

Next, a method for manufacturing the centering vise (gripping tool) in the present embodiment will be described with reference to FIGS. 13 and 14. The method for manufacturing the centering vise (gripping tool) in the present embodiment is characterized in that the above-described first positioner (serrations 21) and the above-described second positioner (groove 22) are finished in the master jaw 20.

First, the plurality of master jaws 20 is attached to the vise body 10 so as to slide toward the center axis J. Specifically, the spindle 90 formed with the thread surface to be screwed to the right screw 91 and the left screw 92 formed in the master jaws 20 is built in the guide groove of the vise body 10, and by rotation of the spindle 90, each master jaw 20 can slide toward the center axis J.

Next, a shaping jig 72 is attached to a five-axis machining center (not shown).

Figure 13:
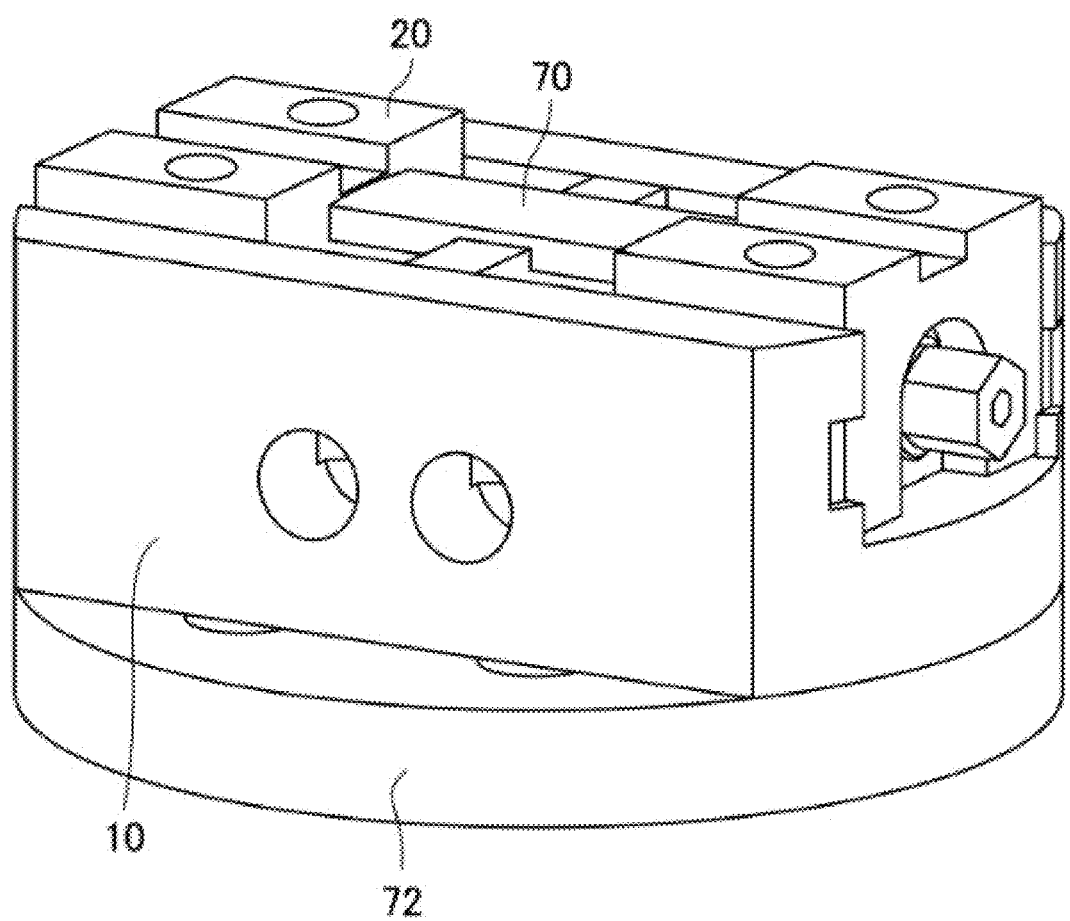
FIG. 13 is a perspective view for describing a method for manufacturing the centering vise.

Next, as shown in FIG. 13, the vise body 10 to which the pair of master jaws 20 is attached is attached to the shaping jig 72. At this time, the center axis J of the vise body 10 and the rotating axis of the five-axis machining center are precisely aligned with each other (coincide with each other).

Next, by rotation of the spindle 90, the pair of master jaws 20 slides toward the center axis J, and a shaping plug 70 is gripped with the pair of master jaws 20.

Next, for finishing the master jaws 20, the tilting axis of the five-axis machining center is determined such that the master jaws 20 are in such a posture that the serrations 21 can be machined.

Figure 14:
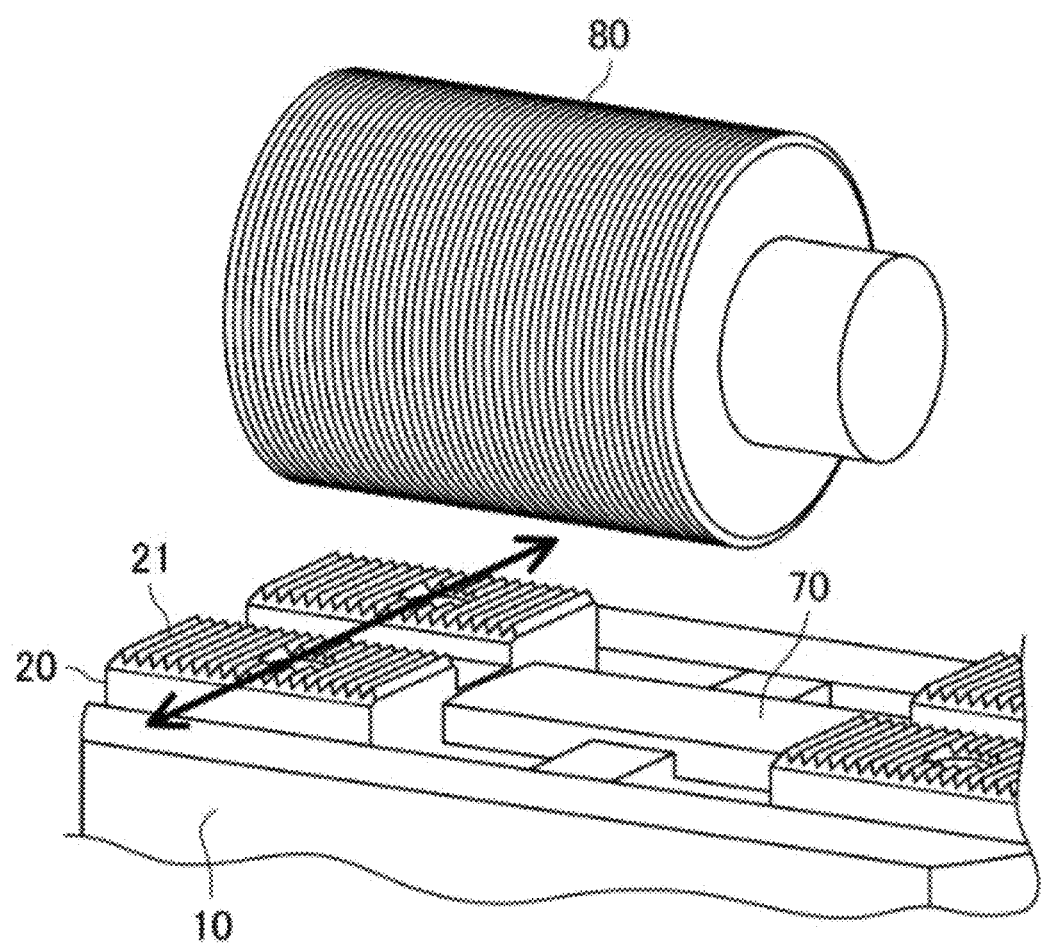
FIG. 14 is a perspective view for describing a step of machining serrations.

As shown in FIG. 14, in a state of the shaping plug 70 being gripped, the serrations 21 extending in the direction perpendicular to the slide direction are finished using a shaping tool 80 while the rotating axis of the five-axis machining center is determined by 180°.

Next, the tilting axis of the five-axis machining center is determined such that the master jaws 20 are in such a posture that the groove 22 can be machined, and thereafter, in a state of the shaping plug 70 being gripped, the groove 22 extending in the slide direction is finished using a shaping tool (not shown) in the master jaws 20. At this time, finishing is performed such that the center of the groove 22 faces the center axis J.

According to the present embodiment, in a state of the shaping plug 70 being gripped, the serrations (first positioner) 21 extending in the direction perpendicular to the slide direction are finished in the surfaces of the pair of master jaws 20, and therefore, the position of the serrations 21 relative to the center axis J, i.e., the distance (radial position) from the center axis J and the position in the direction of the center axis J, can be aligned among the pair of master jaws 20.

Moreover, in a state of the shaping plug 70 being gripped, the groove (second positioner) 22 extending in the slide direction is finished in each of the pair of master jaws 20, and therefore, the position of the groove 22 relative to the center axis J (position in the direction perpendicular to the slide direction) can be aligned among the pair of master jaws 20.

With these configurations, even when a top jaw 30 of a centering vise (gripping tool) obtained by on-machine shaping is attached to a master jaw 20 of another centering vise, workpiece gripping accuracy can be favorably maintained, and the compatibility of the top jaw 30 can be ensured. In addition, since the top jaw 30 has the compatibility, top jaws 30 obtained by on-machine shaping can be replaced with each other among a pair of master jaws 20 in one centering vise.

As in the first embodiment, in the present embodiment, it is important that the pair of master jaws 20 grips the shaping plug 70 by sliding toward the center axis J in a state of the pair of master jaws 20 being attached to the vise body 10 and the serrations (first positioner) 21 and the groove (second positioner) 22 are finished in the pair of master jaws 20 in this state.

Machining itself of the serrations 21 and the groove 22 is not limited to the five-axis machining center, and by mounting a well-known indexing device (e.g., rotary table, NC rotary table, or index table) on various machine tools as necessary, may be performed while the machining positions of the serrations 21 and the groove 22 are determined.

In a case where machining accuracy can be ensured, two grooves 22 may be continuously finished without determination in the middle because the two grooves 22 are on a straight line.

Modification of First Embodiment

In the chuck (gripping tool) of the first embodiment, the serrations 21 extending in the direction perpendicular to the slide direction are formed, in each master jaw 20, as the first positioner that determines the distance of the top jaw 30 from the center axis J. Moreover, the groove 22 extending in the slide direction is formed, in each master jaw 20, as the second positioner that determines the position of the top jaw 30 in the direction perpendicular to the slide direction.

Figure 15:
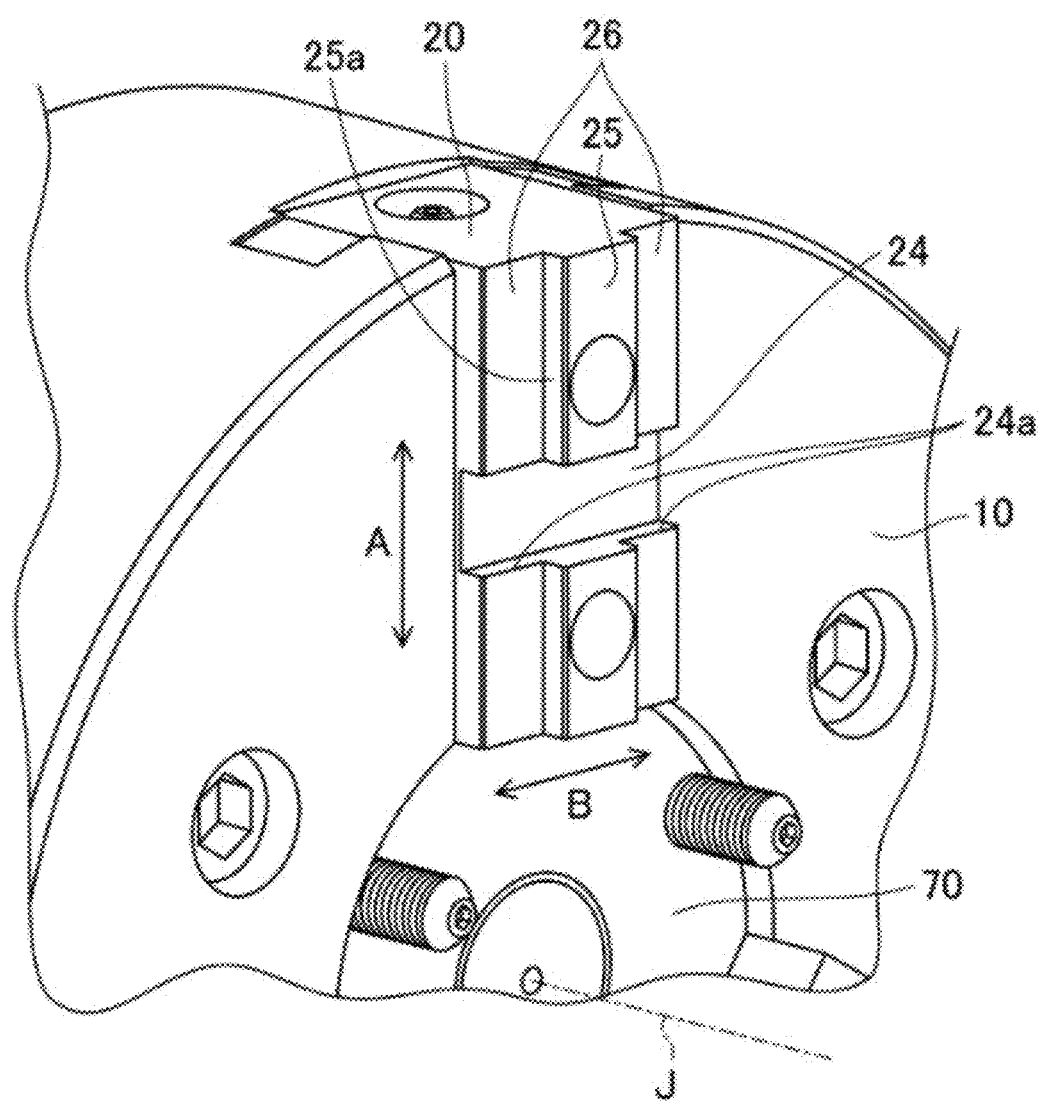
FIG. 15 is a perspective view showing part of the configuration of a chuck in a modification of the first embodiment.

In the present modification, as shown in FIG. 15, a groove 24 extending in the direction (B-direction in the figure) perpendicular to the slide direction (A-direction in the figure) is formed, in a center portion of each master jaw 20 in the slide direction, as the first positioner that determines the distance of the top jaw 30 from the center axis J. Moreover, protrusions 25 extending in the slide direction are formed, at a center portion of each master jaw 20, as the second positioner that determines the position of the top jaw 30 in the direction perpendicular to the slide direction.

Figure 16:
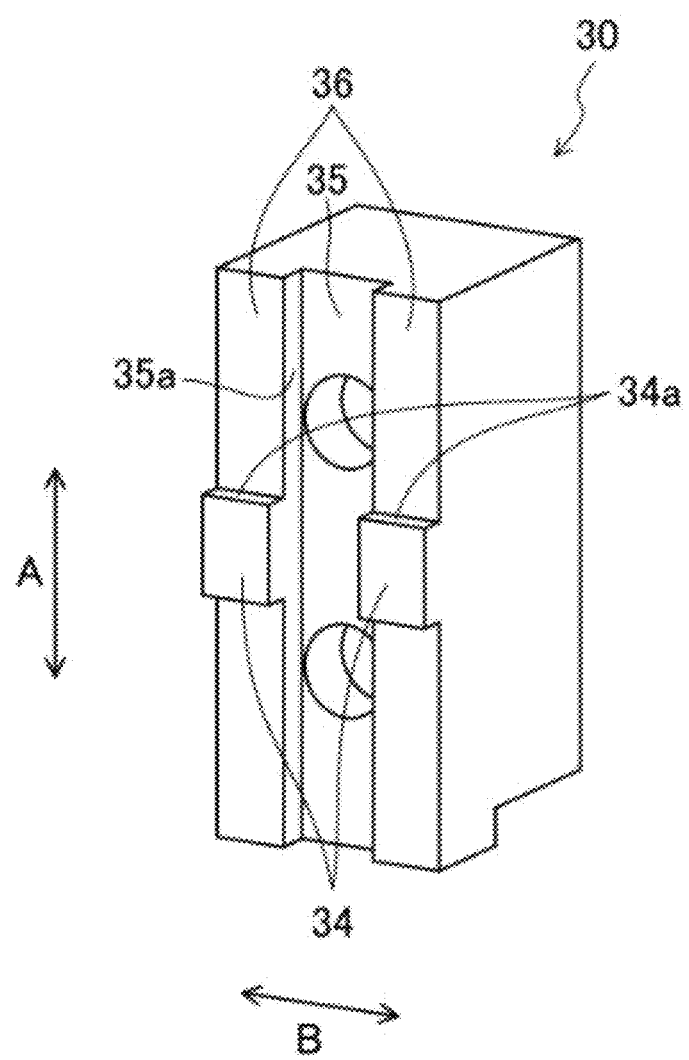
FIG. 16 is a perspective view showing the configuration of a top jaw.

On the other hand, as shown in FIG. 16, protruding keys 34 extending in the direction (B-direction in the figure) perpendicular to the slide direction (A-direction in the figure) are formed at a center portion of each top jaw 30 in the slide direction. Moreover, a key groove 35 extending in the slide direction is formed in a center portion of each top jaw 30.

The keys 34 of the top jaw 30 are fitted in the groove 24 of the master jaw 20 such that attachment surfaces 36 of the top jaw 30 closely contact attachment surfaces 26 of the master jaw 20 and side surfaces 34a of the keys 34 of the top jaw 30 closely contact side surfaces 24a of the groove 24 of the master jaw 20, and in this manner, the top jaw 30 is positioned in the slide direction and the direction of the center axis J. Accordingly, the distance of the gripping surface 33 from the center axis J is determined.

The protrusions 25 of the master jaw 20 are fitted in the key groove 35 of the top jaw 30 such that side surfaces 35a of the key groove 35 closely contact side surfaces 25a of the protrusions 25, and in this manner, the top jaw 30 is positioned in the direction perpendicular to the slide direction. Accordingly, the position of the gripping surface 33 relative to the center axis J in the direction perpendicular to the slide direction is determined.

Finishing of each master jaw 20 in the present modification is performed on the side surfaces 24a of the groove 24, the attachment surfaces 26, and the side surfaces 25a of the protrusions 25. As in the first embodiment, by mounting a well-known indexing device (e.g., rotary table, NC rotary table, or index table) on a machine tool, such finishing may be performed while the machining positions of the groove 24 and the protrusions 25 are determined.

Note that in the present modification, the expensive five-axis machining center used in the first embodiment is not necessarily used as the indexing device and a combination of three-axis machining center and a one-axis NC rotary table may be used. Alternatively, only a machining center with favorable accuracy may be used.

That is, the plurality of master jaws 20 may be attached to the chuck body 10 so as to slide toward the center axis J, and thereafter, may grip the shaping plug 70 by sliding toward the center axis J. Then, in a state of the shaping plug 70 being gripped, the grooves 24 extending in the direction perpendicular to the slide direction and the protrusions 25 extending in the slide direction may be finished in the surfaces of the plurality of master jaws 20.

According to the present modification, in a state of the shaping plug 70 being gripped, the grooves (first positioner) 24 extending in the direction perpendicular to the slide direction are finished in the surfaces of the plurality of master jaws 20, and therefore, the distance (radial position) of the groove 24 from the center axis J can be aligned among all the master jaws 20.

Moreover, in a state of the shaping plug 70 being gripped, the side surfaces 25a and the attachment surfaces 26 are finished in the plurality of master jaws 20 such that the center of the protrusion (second positioner) 25 extending in the slide direction faces the center axis J, and therefore, the position of the protrusion 25 in the direction perpendicular to the slide direction and the position of the protrusion 25 in the direction of the center axis J can be aligned among all the master jaws 20.

With these configurations, even when a top jaw 30 of a certain chuck (gripping tool) obtained by on-machine shaping is attached to a master jaw 20 of another chuck, workpiece gripping accuracy can be favorably maintained, and the compatibility of the top jaw 30 can be ensured. In addition, since the top jaw 30 has the compatibility, top jaws 30 obtained by on-machine shaping can be replaced with each other among a plurality of master jaws 20 in one chuck.

The present invention has been described above with reference to the preferred embodiments, but such description is not intended to limit the present invention and various modification can be made, needless to say. For example, in the above-described embodiments and modification, the first positioner (serrations 21, groove 24) and the second positioner (groove 22, protrusions 25) are formed in the master jaw 20. However, for example, in a case where the accuracy of positioning in the direction perpendicular to the slide direction is not so important, such as a quadrangular workpiece, on-machine shaping of the second positioner is not necessarily performed. In this case, the second positioner may be individually finished in the master jaw.

In the above-described embodiments, the chuck and the centering vise have been described as examples of the gripping tool that grips the workpiece, but the present invention is not limited thereto and the gripping tool may be one having a centering function of gripping the workpiece with the top jaws 30 attached to the plurality of master jaws 20 in a state of the distance from the center axis J being determined.

Due to finishing in the first embodiment and modification thereof and the second embodiment, cutting fluid or machining dust may enter the inside of the gripping tool. Thus, as necessary, a step of disassembling and cleaning components forming the gripping tool may be performed after finishing, and thereafter, a step of assembling the gripping tool may be finally performed.

DESCRIPTION OF REFERENCE CHARACTERS

10 Chuck Body, Vise Body (Gripping Tool Body)
20 Master Jaw
21 Serration (First Positioner)
22 Groove (Second Positioner)
24 Groove (First Positioner)
24a Side Surface of Groove
25 Protrusion (Second Positioner)
25a Side Surface of Protrusion
26 Attachment Surface
30 Top Jaw
31 Serration
32 Key Groove
33 Gripping Surface
34 Key
34a Side Surface of Key
35 Key Groove
35a Side Surface of Key Groove
36 Attachment Surface
40 T-Nut (Coupling Member)
41 Wide Portion
42 Narrow Portion
45 Coupling Member
50 Plunger
60 to 62 Bolt
63 Shaping Plug Gripping Bolt
70 Shaping Plug
71 Dustproof Cover
72 Shaping Jig
73 Five-Axis Machining Center
80, 81 Shaping Tool
90 Spindle

The invention claimed is:
1. A method for manufacturing a gripping tool for gripping a workpiece with a plurality of top jaws each attached to a plurality of master jaws attached to a surface of a gripping tool body such that a center of the workpiece coincides with a center axis by sliding the plurality of master jaws toward the center axis,
a first positioner that determines a distance of each top jaw from the center axis when each top jaw is attached to a corresponding one of the master jaws being formed in a direction perpendicular to a slide direction in a surface of each master jaw, the method comprising:
a step of attaching the plurality of master jaws to the gripping tool body such that the plurality of master jaws is slidable toward the center axis;
a step of gripping a shaping plug with the plurality of master jaws by sliding the plurality of master jaws toward the center axis; and
a step of finishing, in the surface of each master jaw, the first positioner extending in the direction perpendicular to the slide direction of the master jaws in a state of the shaping plug being gripped.

2. The method for manufacturing the gripping tool according to claim 1, wherein
the first positioner includes a serration or a groove formed in the direction perpendicular to the slide direction.

3. The method for manufacturing the gripping tool according to claim 1,
a second positioner that determines a position of each top jaw in the direction perpendicular to the slide direction when each top jaw is attached to a corresponding one of the master jaws being formed in the slide direction in each master jaw, the method further comprising:
a step of finishing, in each master jaw, the second positioner extending in the slide direction in a state of the shaping plug being gripped.

4. The method for manufacturing the gripping tool according to claim 3, wherein
the second positioner includes a groove or a protrusion formed along the slide direction.

5. The method for manufacturing the gripping tool according to claim 2,
a second positioner that determines a position of each top jaw in the direction perpendicular to the slide direction when each top jaw is attached to a corresponding one of the master jaws being formed in the slide direction in each master jaw, the method further comprising:
a step of finishing, in each master jaw, the second positioner extending in the slide direction in a state of the shaping plug being gripped.

6. The method for manufacturing the gripping tool according to claim 5, wherein
the second positioner includes a groove or a protrusion formed along the slide direction.

* * * * *